(12) United States Patent
Berendes et al.

(10) Patent No.: US 8,474,333 B2
(45) Date of Patent: Jul. 2, 2013

(54) INDUSTRIAL ROLL WITH OPTICAL ROLL COVER SENSOR SYSTEM

(75) Inventors: Antje Berendes, Grafenback (AT); Norbert Gamsjaeger, Bad Fischau (AT); Wolfgang Ecke, Jena (DE); Manfred Rothhardt, Jena OT Kunitz (DE)

(73) Assignee: Voith Patent GmbH, Heidenheim (DE)

( * ) Notice: Subject to any disclaimer, the term of this patent is extended or adjusted under 35 U.S.C. 154(b) by 286 days.

(21) Appl. No.: 13/070,203

(22) Filed: Mar. 23, 2011

(65) Prior Publication Data

US 2011/0226070 A1   Sep. 22, 2011

Related U.S. Application Data

(63) Continuation of application No. PCT/EP2008/008050, filed on Sep. 23, 2008.

(51) Int. Cl.
*G01L 5/00* (2006.01)
*G01L 1/24* (2006.01)

(52) U.S. Cl.
USPC .......................................... 73/862.55; 73/800

(58) Field of Classification Search
USPC ..................... 73/760, 800, 862.55
See application file for complete search history.

(56) References Cited

U.S. PATENT DOCUMENTS

| | | | |
|---|---|---|---|
| 4,806,012 A | 2/1989 | Meltz et al. | |
| 4,996,419 A | 2/1991 | Morey | |
| 5,557,100 A | 9/1996 | Jeuniaux et al. | |
| 5,562,027 A * | 10/1996 | Moore | 100/35 |
| 5,792,747 A | 8/1998 | Schally et al. | |
| 6,205,369 B1 * | 3/2001 | Moore | 700/122 |
| 6,524,229 B2 * | 2/2003 | Pramila et al. | 492/10 |

(Continued)

FOREIGN PATENT DOCUMENTS

| EP | 1 392 917 B1 | 5/2006 |
|---|---|---|
| WO | 96/22782 A1 | 8/1996 |
| WO | 03076887 A1 | 9/2003 |

OTHER PUBLICATIONS

International Search Report dated Jul. 3, 2009 and Written Opinion of the International Searching Authority for PCT/EP2008/008050 (9 pages).

(Continued)

*Primary Examiner* — Max Noori
(74) *Attorney, Agent, or Firm* — Taylor IP, P.C.

(57) ABSTRACT

An industrial roll is provided, comprising a transverse force transducing fiber Bragg sensor that is embedded in the roll cover and/or located in-between the roll cover and the roll core of the industrial roll. The transverse force transducing fiber Bragg sensor comprises a fiber optical waveguide having a fiber core and a fiber cladding, and a stud element being nonpositively joined to a partial area of the circumferential surface of the fiber optical waveguide. The fiber optical waveguide comprises a Bragg grating located in the fiber core, whereby the dimension of the partial area in the longitudinal direction of the fiber is longer than a grating spacing of the Bragg grating. The partial area is located at a section of the fiber optical waveguide housing the Bragg grating, and at least a first component of the stud element is formed from a first material having a Young's modulus of less than 10 $kN/mm^2$.

30 Claims, 4 Drawing Sheets

U.S. PATENT DOCUMENTS

| | | | |
|---|---|---|---|
| 6,981,935 B2* | 1/2006 | Gustafson | 492/10 |
| 7,085,057 B2* | 8/2006 | Karam, II | 359/572 |
| 2002/0179270 A1 | 12/2002 | Gustafson et al. | |
| 2003/0071202 A1* | 4/2003 | Ames | 250/227.14 |
| 2005/0285059 A1 | 12/2005 | Gerber et al. | |

OTHER PUBLICATIONS

International Preliminary Report on Patentability dated Mar. 29, 2011 for PCT/EP2008/008050 (6 pages).

* cited by examiner

INDUSTRIAL ROLL WITH OPTICAL ROLL COVER SENSOR SYSTEM

CROSS REFERENCE TO RELATED APPLICATIONS

This is a continuation of PCT application No. PCT/EP2008/008050, entitled "INDUSTRIAL ROLL WITH OPTICAL ROLL COVER SENSOR SYSTEM", filed Sep. 23, 2008, which is incorporated herein by reference.

BACKGROUND OF THE INVENTION

1. Field of the Invention

The invention relates to pressure measurement in roll covers for industrial rolls and in particular to the use of fiber Bragg grating sensors for determining a pressure imposed on a roll cover.

2. Description of the Related Art

Rolls are used in industrial papermaking for guiding, drying, and pressing the fibrous web sheet, which is the elementary body for the paper production. Rolls are further used in papermaking machines as guiding rollers for wet, press and dryer felts. In some sections of a papermaking machine the fiber web is conveyed between two cooperating rolls, where it is pressed in the nip formed between these rolls. The properties of a paper processed from the fiber web do strongly depend on the pressure profiles present in the nip sections between the various cooperating rolls. Manufacturers of paper are therefore anxious to monitor and control the pressure profiles in these nip sections.

The nip pressure is typically monitored with sensors placed between the roll core and the roll cover or inside the roll cover. Radial forces, i.e. forces acting in the radial direction of a roll, are usually measured using piezoelectric or electro-mechanic sensors, which both produce a voltage indicative of their deformation upon being pressurized. Since paper machine rolls rotate at a high speed, the sensor signals are usually transmitted to a signal processing unit external to the roll by means of a radio transmitter.

Apart from electrical sensors also fiber optical sensors are used for monitoring the pressure conditions within a nip. Fiber optical sensors generally use a fiber optical waveguide as sensing element, whereby the strain exerted on the fiber is determined by the impact of the strain on the fiber's optical properties.

In conventional optical fibers the strain or bending induced variation in the intensity of light passing the fiber is used as a measurement signal. But since measurement signals obtained by these effects carry no information regarding the location of the signal's origin, it is not possible to determine the position where the optical properties of the fiber have been changed.

If also the point of origin of a measuring signal is of importance, optical fibers comprising several discernable measuring sections are preferred. In a fiber Bragg grating sensor a respective measuring section is formed by a Bragg grating located in the fiber core. A Bragg grating consists of a sequence of variations in the refractive index of the fiber core along the longitudinal direction of the optical fiber. Depending on the respective measurement problem, the distances between consecutive changes in the (typically two) refractive indices (so-called grating spacings) are constant or vary within one Bragg grating. Light passing the core of the optical fiber is partially reflected at each refractive index changeover, with the coefficient of reflection depending on the refractive indices involved and the wavelength of the light. Multiple reflections at a sequence of changeovers in the refractive index lead to either a constructive or destructive interference. Therefore, only one wavelength will be (at least partly) reflected, when the grating spacing of a Bragg grating measuring section is constant, and multiple wavelengths will be reflected, when the grating spacing within one measuring section varies. The wavelengths of the reflected light and the coefficient of reflectance achieved depend on the grating spacings used, the refractive indices involved and the grating length given due to the number of refractive index changeovers present in a measuring section.

When the measuring section, i.e. the section of the fiber containing the Bragg grating, is exposed to strain, the grating spacings change thereby causing a proportional shift in the wavelength of the light reflected at the grating. A measurable wavelength shift is only obtained when the Bragg grating section of an optical fiber is stretched or compressed along its longitudinal direction. Forces acting transverse to the fiber axis do not provoke a measurable change in the grating spacings but only minor Bragg wavelength shifts by photo-elastic effects. Fiber Bragg sensors are therefore primarily used as strain sensors and not as pressure or force sensors.

The pressure profile in the nip section of two cooperating rolls is practically described by the forces acting radially on the rolls. For measuring these forces directly, the Bragg grating of a fiber Bragg sensor would have to be oriented in a radial direction of the roll. A respective arrangement is not practical, since the grating length of a fiber Bragg grating is in the order of millimeters and thus too long to be used within a roll cover. Furthermore, the minimum-bending radius of an optical fiber is in the order of approximately one centimeter, thus rendering the total minimum height of the fiber with respect to the radial direction too long for practical applications. For the same reason of limited bending radius, a radial orientation of a fiber Bragg grating in the roll cover allows only one measuring section per fiber, so that a separate fiber is required for each measuring location.

Optical fiber sensors are therefore usually arranged to measure the hoop strain induced in a roll cover by the forces acting in the nip section. For detecting the hoop strain of a roll cover, the optical fiber is embedded within the roll cover or at the boundary between the roll cover and the roll core. An arrangement appropriate for determining the tangential strain in a roll cover is disclosed in European patent EP 1 392 917 B1, where preferably micro-bend fiber optic sensors are disposed along a helical, axial, circumferential, and a "somewhat random" configuration. The optical fiber configurations presented in European patent specification EP 0 809 507 B1 include spirals, waves, scattered and straight lines along the length of the roll parallel to the roll axis. When using a waveform like a wiggly line, the measuring sections of the fiber, e.g. the Bragg gratings, are oriented in the circumferential direction of the roll or have at least a component in that direction.

When using more than one measuring section within one Bragg sensor fiber, the measurement signals have to be assigned to their respective measuring section of origin. If the fiber of a fiber Bragg sensor is arranged in a helical configuration, each measuring section crosses the nip at a different angular position of the roll. The measuring section assignment may therefore be implemented using the rotation angle of the roll.

A further method of identifying the measuring section from which a certain light reflection originates is based on a determination of the time interval between the launching of a light pulse into the Bragg fiber and the detection of a light echo reflected from one of the Bragg gratings in the fiber. A respective time multiplexed fiber Bragg grating sensor arrangement is for instance disclosed in the patent specification U.S. Pat. No. 4,996,419.

Instead of time multiplexing, wavelength multiplexing can be used for identifying a measuring section giving rise to a certain measuring signal. An example for such a distributed, spatially resolving optical fiber strain gauge is disclosed in document U.S. Pat. No. 4,806,012. In the described Bragg fiber, the grating spacing of one Bragg grating differs to any grating spacing of another Bragg grating formed in the same fiber. Accordingly the basic wavelength of a light echo produced on one grating differs from that produced on each of the other gratings. In this context it is noted that the term "light echo" as used in this specification refers to the light reflected on a Bragg grating in a Bragg fiber. A Bragg fiber hereby refers to an optical fiber having one or more Bragg gratings formed within its fiber core. The term "basic wavelength" as used in this specification refers to the wavelength of a light echo produced with a Bragg grating not exposed to strain. The spacing between the basic wavelengths of the different Bragg gratings of a Bragg fiber is usually chosen longer than the wavelength shifts expected for the Bragg fiber when used as designed for.

Irrespective of the type of Bragg fiber used, a fiber Bragg sensor embedded in a roll cover will only allow to determine the deformation of the roll cover caused by the forces acting in the nip and not the radial forces affecting the roll within the nip area. Variations in the deformation of the cover along the length of a roll are small compared to the variation of the deformation in the circumferential direction of the roll, since the pressure difference along the length of the roll is typically much smaller than between the inside and the outside of the nip. A Bragg fiber arranged along the length of a roll and parallel to the roll axis will therefore produce only small shifts in the wavelength of light reflected at a Bragg grating if any, with the shift values being furthermore not indicative of the absolute value of the compressing forces present in the nip. To get an indication of the absolute values of the compressing forces in the nip, the Bragg gratings are oriented with a component showing towards the circumferential direction of the roll. But even this does not allow a reliable suggestion of the forces present between two corresponding rolls, since the relation between the cover deformation and the compressing forces is very complex due to the elasticity of the roll cover.

A further drawback of fiber Bragg sensors is the limited number of discernible measuring sections, which can be arranged within one fiber. A Bragg fiber sensor consists of usually not more than between ten and twenty-five gratings, which will limit the density of measuring points available for determining the pressure profile in the nip.

What is needed in the art is to provide an improved optical fiber Bragg sensing system for the characterization of pressure profiles in a nip section of two cooperating rolls.

SUMMARY OF THE INVENTION

The present invention provides an industrial roll, comprising:
a roll core having a section with a substantially cylindrical geometry;
a roll cover sheathing the cylindrical section of the roll core at least in part; and
one or more fiber optical sensors embedded in the roll cover and/or located in-between the roll cover and the roll core; wherein one or more of the fiber optical sensors comprise at least one measuring section that is formed by a transverse force transducing fiber Bragg sensor comprising a fiber optical waveguide and a stud element, with the fiber optical waveguide comprising a fiber core and a fiber cladding, and with the stud element being nonpositively joined to a partial area of the circumferential surface of the fiber optical waveguide, and wherein the fiber optical waveguide comprises a Bragg grating located in the fiber core; the dimension of the partial area in the longitudinal direction of the fiber is longer than a grating spacing of the Bragg grating; the partial area is located at a section of the fiber optical waveguide which houses the Bragg grating; and at least a first component of the stud element is formed from a first material having a Young's modulus of less than 10 kN/mm$^2$.

The present invention comprises an industrial roll with a roll core having a section with a substantially cylindrical geometry, a roll cover sheathing the cylindrical section of the roll core at least in part, and one or more fiber optical sensors embedded in the roll cover and/or located in-between the roll cover and the roll core. One or more of the fiber optical sensors comprise at least one measuring section that is formed by a transverse force transducing fiber Bragg sensor comprising a fiber optical waveguide and a stud element, with the fiber optical waveguide comprising a fiber core and a fiber cladding, and with the stud element being nonpositively joined to a partial area of the circumferential surface of the fiber optical waveguide. The fiber optical waveguide hereby comprises a Bragg grating located in the fiber core. Further, the dimension of the partial area in the longitudinal direction of the fiber is longer than a grating spacing of the Bragg grating, and the partial area is located at a section of the fiber optical waveguide which houses the Bragg grating. Furthermore, at least a first component of the stud element is formed from a first material having a Young's modulus of less than 10 kN/mm$^2$ (equals 10 GPa).

An industrial roll as defined above advantageously enables a straight measurement of forces directed radially on the industrial roll.

The invention further comprises a roll cover comprising one or more fiber optical sensors embedded in the roll cover and/or located in-between the roll cover and the roll core; wherein one or more of the fiber optical sensors are formed by a transverse force transducing fiber Bragg sensor comprising a fiber optical waveguide and a stud element, with the fiber optical waveguide comprising a fiber core and a fiber cladding, and with the stud element being nonpositively joined to a partial area of the circumferential surface of the fiber optical waveguide, and wherein the fiber optical waveguide comprises a Bragg grating located in the fiber core, the dimension of the partial area in the longitudinal direction of the fiber is longer than a grating spacing of the Bragg grating, the partial area is located at a section of the fiber optical waveguide which houses the Bragg grating, and at least a first component of the stud element is formed from a first material having a Young's modulus of less than 10 kN/mm2.

The invention also comprises a fiber optical sensor corresponding to a transverse force transducing fiber Bragg sensor as described above as part of the industrial roll and/or the roll cover.

The compressibility of the first material used for the stud element of a fiber optical sensor specified above is preferably low being characterized by a bulk modulus of preferably more than 1010 Pa (corresponding to 1010 N/m2 equaling 10 GPa). The low compressibility guarantees an efficient transformation of transverse forces into a longitudinal deformation of the stud element.

In a preferred embodiment of an above specified fiber optical sensor, the first material has a Young's modulus of less than 1 kN/mm2 and more preferably a Young's modulus in the range of 0.001 to 0.01 kN/mm2.

The stud element advantageously comprises at least one second component formed of a second material and arranged on the circumferential surface of the fiber optical waveguide adjacent to the first component with respect to the longitudinal direction of the optical fiber, whereby the second material has a Young's modulus of less than 10 kN/mm2 and a high compressibility characterized by a bulk modulus of preferably less than 106 N/m2.

The stud element may further be implemented comprising two second components adjoining the first component on opposite sides with respect to the longitudinal direction of the fiber optical waveguide, thus enabling a symmetric deformation of the stud element.

According to an advantageous development, the transverse force transducing fiber Bragg sensor is preferably embedded in the roll cover and/or in-between the roll cover and the roll core, with the stud element being located within a cavity formed in the roll cover and/or in-between the roll cover and the roll core. To enable an elongation of the Bragg grating joined to the stud element when exposed to a transverse force, the dimension of the cavity in the longitudinal direction of the fiber optical waveguide is preferably larger than that of the stud element in that direction. This allows the stud element to intrude the cavity upon being pressed. An improved sensitivity is achieved with the stud element being arranged within the cavity so as to leave a void on both sides of the stud element with respect to the longitudinal direction of the fiber optical waveguide.

An effective transformation of transverse forces in a longitudinal strain of a fiber Bragg grating is achieved by the stud element being arranged on the fiber optical waveguide such that the fiber optical waveguide penetrates the stud element. To achieve a controlled transformation of forces directed in a radial direction of the fiber optical waveguide, the stud element may further have a rotationally symmetric geometry with the axis of the fiber optical waveguide located at the axis of symmetry of the stud element.

The first component of the stud element may further have a shape resembling a sphere, a prolate or oblate spheroid, a double cone, a disk, a cylinder, a bellied cylinder or the like more rotational shapes, which enable a defined transformation of transverse forces in longitudinal forces.

If a fiber optical sensor with a stud element comprising a first element sandwiched between two second components in the longitudinal fiber direction is embedded in a further material, a relatively homogenous compression of the second component can be achieved with the second component of the stud element having a roughly conical or truncated conical, i.e. frustum shape contacting the first component with the base of the geometry.

If the optical fiber comprises a coating, like e.g. a protection coating, the coating forms preferably part of the nonpositive joint between the stud element and the circumferential surface of the fiber optical waveguide.

In a preferred embodiment, silicone rubber is used for the first material and/or polymer foam for the second material.

The industrial roll further advantageously comprises a sensor supply means with a broad-band light source for launching light into the fiber optical sensor, a coupler adapted for coupling out light from a fiber Bragg sensor which has been reflected at a Bragg grating of the fiber Bragg sensor, a spectral sensor for a wavelength sensitive conversion of light coupled out from the fiber Bragg sensor into electrical measurement signals, a signal processing means for processing the measurement signals, and a transmitting means for transmitting the processed measurement signals. The sensor supply means is hereby preferably located on a side face at the rim area of the circumferential surface of the roll. The optical components of the sensor supply means are hereby preferably arranged on a side face of the cylindrical section of the roll core such that the effects of diverging components of centrifugal forces acting on individual optical components are minimized.

To enable measurements at different locations with only one fiber, at least one fiber Bragg sensor comprises more than one Bragg grating with different grating spacings. This allows identifying the Bragg grating giving rise to a measuring signal by the wavelength of the signal. A respective measuring method is called wavelength multiplexing.

To further augment the number of discernible measuring points in a single fiber, groups of Bragg gratings separated from each other by a fiber optical waveguide section containing no Bragg gratings are provided, whereby the Bragg gratings within a group of Bragg gratings have different grating spacings, and whereby the length of a fiber optical waveguide section separating two groups of Bragg gratings is chosen sufficiently long in order to enable a time-separated registration of light reflected in different groups of Bragg gratings. Hereby the grating spacings of Bragg gratings within one group of Bragg gratings preferably correspond to the grating spacings of Bragg gratings within another group of Bragg gratings, allowing the maximum number of gratings within a group.

With at least one fiber optical sensor being embedded in the roll cover and/or in-between the roll cover and the roll core substantially in parallel to the axis of rotational symmetry of the roll, the fiber Bragg sensor is not influenced by a tangential stretching of the roll cover thereby providing measuring signals being directly related to nip forces directed in the radial direction of the industrial roll. To accommodate a fiber Bragg sensor with a multitude of Bragg grating groups separated by 'delay' sections in-between, the sections of the fiber Bragg sensor containing a group of Bragg gratings are advantageously oriented in parallel to the axis of rotational symmetry of the roll, and the sections of the fiber Bragg sensor separating two groups of Bragg gratings are preferably oriented along a substantially helical line around the axis of rotational symmetry of the roll. Thus a multitude of Bragg gratings can be arranged in a line parallel to the rotation axis of the industrial roll, without the 'delay' sections resulting in an increased distance between Bragg gratings.

With at least one fiber optical sensor being embedded in the roll cover and/or in-between the roll cover and the roll core substantially along a helical line around the axis of rotational symmetry of the roll, it is possible to determine the hoop strain of the roll cover in the nip section.

To minimize the tensile load exerted on the fiber, at least one fiber optical sensor may be embedded in the roll cover and/or in-between the roll cover and the roll core with at least one fiber Bragg grating being oriented at an angle of between 10° to 80° with respect to the circumferential direction of the roll, and preferably at an angle of 45° with respect to the circumferential direction of the roll.

Advantageously at least one of the Bragg gratings located in a section of the fiber Bragg sensor oriented along a substantially helical line around the axis of rotational symmetry of the roll is not joined to a stud element.

In a preferred embodiment the roll cover has elastic properties characterized by a Young's modulus in the range of 5 kN/mm2 to 10 kN/mm2.

Further features of the invention will be apparent from the description of embodiments of the invention together with the claims and the attached figures. Embodiments of the invention may implement single features or several features in combination.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
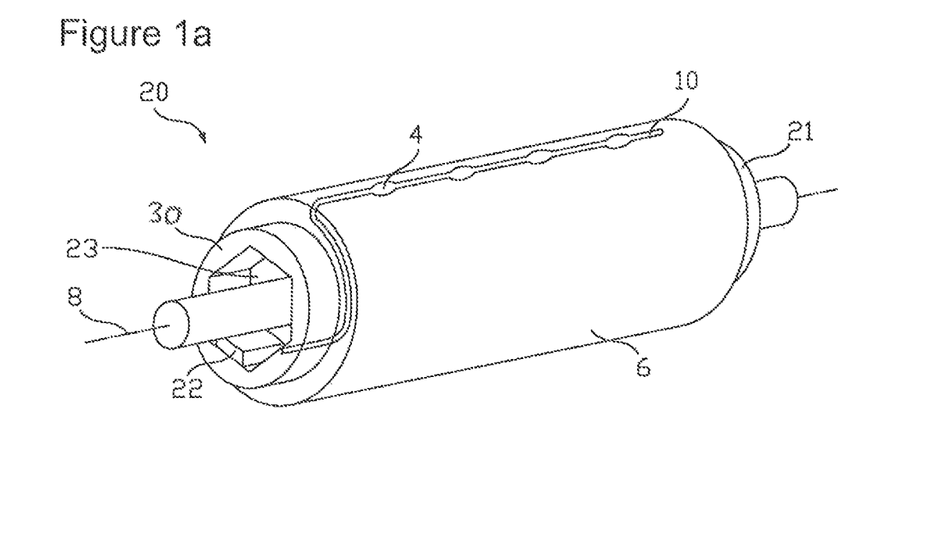
FIG. 1a shows an industrial roll having a roll cover with a fiber Bragg sensor embedded in the roll cover parallel to the axis of rotation.

Referring now to the drawings, and more particularly to FIG. 1a, there is shown a schematic representation of an industrial roll 20 with an optical roll cover sensor system. The industrial roll 20 comprises a roll core 21 with a substantially circular cylindrical corpus and a roll cover 6 sheathing the major part of the corpus. The roll core 21 may be made of metal or fiber-reinforced plastics or any other suitable material used for industrial roll cores 21. The corpus of the roll core 21 may be configured with a shell having an outer surface and an internal lumen so that the roll cover 6 overlays the outer surface either in total or except for the edgewise rims.

For the roll cover 6, any commonly used material like rubber, polyurethane, fiber-reinforced plastics and the like can be used.

The roll cover 6 further comprises an embedded fiber Bragg sensor 10 that is adapted to measure forces directed transverse to the longitudinal direction of the fiber 1, that is in a with respect to the industrial roll 20 radial direction. The fiber Bragg sensor 10 comprises one or more stud elements 4 described in more detail below, which elongate (or alternatively compress) Bragg gratings located in the fiber 1 upon being compressed.

Figure 1B:
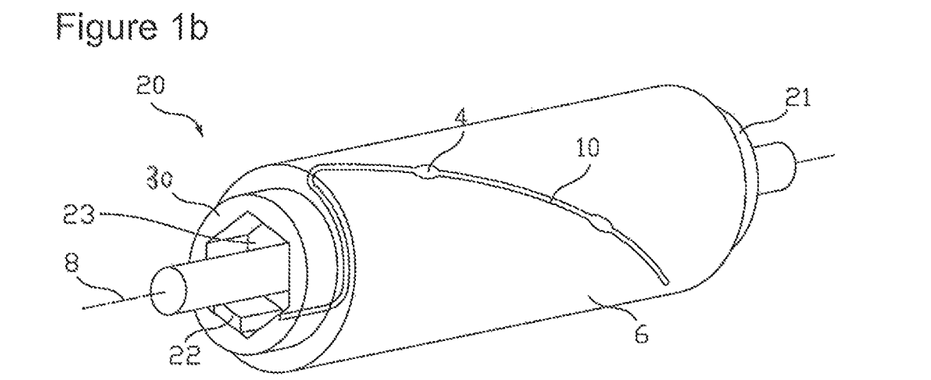
FIG. 1b shows an industrial roll having a roll cover with a fiber Bragg sensor embedded in the roll cover along a helical line around the axis of rotation.
Figure 1C:
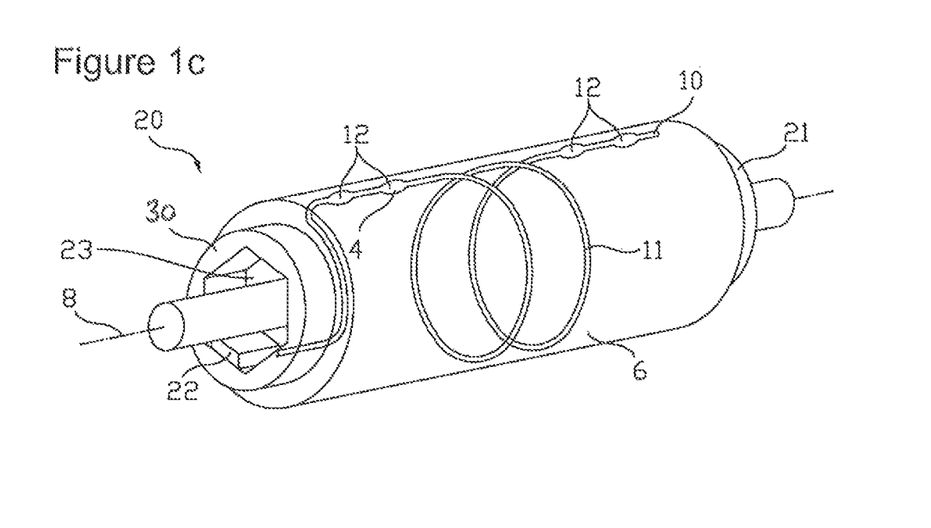
FIG. 1c shows an industrial roll having a roll cover with a fiber Bragg sensor embedded in the roll cover, whereby two sections of the sensor are orientated parallel to the axis of rotation, and the section between these two is oriented along a helical line around the axis of rotation.

On at least one side face of the roll 20 a support for mounting a sensor supply means 22 is provided. In the example shown in FIGS. 1a to 1c, a housing 30 mounted on the side face of the roll core 21 forms the support. The sensor supply means 22 is arranged within a recess 23 of the housing 30. The term sensor supply means 22 as used in this specification denotes equipment used for operating the fiber Bragg sensor 10, that is for launching light into the sensor 10, for determining the wavelength distribution and intensity of the light reflected at the Bragg gratings of the fiber optical sensor 10 and for providing measurement signals representing the reflected light characteristics. The sensor supply means 22 preferably further comprises a transmitter or transceiver for enabling a wireless data communication with measurement equipment or control equipment remote to the industrial roll 20. The sidewalls of recess 23 are preferably flat and have a tangential orientation with respect to the rotation axis 8 of the industrial roll 20. The sensor supply means 22 is preferably mounted on these sidewalls in order to make sure that the individual components and of these in particular the optical components are not subject to diverging centrifugal forces. Although the sensor supply means 22 is represented in FIGS. 1a to 1c as a single module, it is noted that the sensor supply means 22 may also comprise several modules, each which may be mounted on a different face of the sidewalls. It is however understood that also one or more modules may share one of the sidewall faces. To avoid unbalanced masses, the sidewalls of recess 23 preferably form a regular polygon.

The sensorized industrial roll 20 shown in FIG. 1b is distinct from the exemplary embodiment shown in FIG. 1a by the way the fiber Bragg sensor 10 is arranged in the roll cover 6. While the fiber Bragg sensor 10 according to the exemplary embodiment of FIG. 1a is oriented in parallel to the rotation axis 8 of the roll 20, the fiber Bragg sensor 10 of FIG. 1b follows a helical line around the rotation axis 8 which extends over only a part of the rolls circumference. In different embodiments, which are not illustrated in one of the figures, the helical line followed by the fiber sensor 10 extends about the full circumference or winds several times around the axis 8. Further, the fiber optical sensor 10 may comprise some blank measuring sections, i.e. Bragg gratings without stud elements 4 attached to it. With these blank measuring sections being oriented having a circumferential component with respect to the rotation axis 8 of the roll 20, also tangential forces due to e.g. hoop strain can be measured.

In FIG. 1c a combination of the two fiber arrangements of FIGS. 1a and 1b is shown. This configuration is the preferred embodiment for fiber optical sensors adapted for combined wavelength and time multiplexing as is described in more detail further below. To enable both multiplexing techniques, the transverse force transducers (formed by stud elements 4) and thus the Bragg gratings served by it, are aggregated in two or more groups 12, being separated by a section 11 of the fiber sensor 10 containing no Bragg gratings. Section 11 delays reflected light signals originating from groups located on the far side of the fiber, thus providing the signals from different groups at a different time.

It is to be noted that different to the representations of FIGS. 1a, 1b, and 1c, more than one fiber Bragg sensor 10 may be used in a roll cover 6, and that one or all of the sensors 10 may also be located in-between the roll cover 6 and the role core 21 instead of being embedded in the roll cover 6 as shown. Guiding the optical fiber 10 through the roll core 21 to the sensor supply means 22 as shown is not mandatory. Arranging the fiber lead in a groove of the roll core 21 is one of many possible alternatives.

Figure 2:
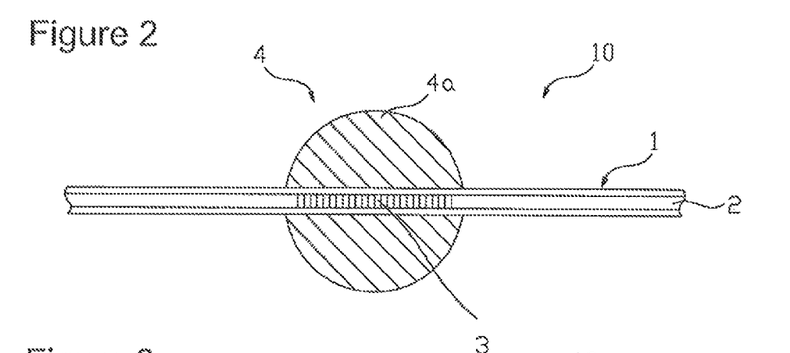
FIG. 2 shows a first example of a transverse force transducing fiber Bragg sensor.

FIG. 2 shows a first exemplary embodiment of a fiber Bragg sensor 10 adapted for the measurement of forces directed transversely to the longitudinal direction of the fiber. The fiber Bragg sensor 10 comprises an optical fiber 1 with a fiber core 2 and a Bragg grating 3 inscribed into the fiber core 2. The fiber core 2 has a higher refractive index than the fiber cladding, i.e. the part of the optical fiber surrounding the fiber core 2, for enabling a light propagation limited to the fiber core by total reflection. The fiber 1 may further have a protective coating (not shown in the figure), which is usually formed by a tough resin buffer layer that may further be surrounded by a plastic jacket layer. Respective protective coatings may be used to improve the mechanical resistivity of the fiber but are not necessarily required for a fiber Bragg sensor according to the invention. A reliable adhesion of the coating on the cladding is required when Bragg fibers 1 having a protective coating are used.

The fiber Bragg sensor 10 of FIG. 2 further comprises a stud element 4 surrounding the optical fiber 1 in the region where the Bragg grating 3 is located. In the illustrated embodiment, the stud element 4 is formed of a single component 4a. The stud element 4 is shown having a spherical shape with the optical Bragg fiber 1 penetrating it at an axis of rotational symmetry. The stud component 4a is made of an elastic material. The term elastic material as used in this specification denotes a material that can be reversibly deformed under stress. This means that an object made from an elastic material is subject to deformation under stress with the object returning to its original shape when the stress is removed. A respective material is also referred to as a flexible material. A high flexibility is given when the range within which the object can be reversibly deformed extends to some percent or even much more of the object dimensions. Some highly elastic materials allow a reversible stretching of an object of up to 700 percent.

The material used for the stud component 4a is further not compressible in a technical sense, i.e., the total volume of the stud component 4a will not vary substantially under deformation. Accordingly, when the spherically shaped stud element 4 of FIG. 2, which is formed of only one component 4a, is compressed by a force acting transverse to the longitudinal direction of the fiber 1, the spherical shape will take on a more oblate form, with the dimension of the stud element 4 being enlarged in the longitudinal direction of the fiber 1. The prolongation of the stud element 4 along the longitudinal direction of the fiber 1 is transferred to the fiber section located within the stud element 4, due to the adhesive contact formed between the stud element 4 and the surface of the fiber 1. The corresponding strain results in a lengthening of the fiber Bragg grating 3 and thus in wider grating spacings. The enlarged grating spacings give further rise to a shift in the wavelength of light reflected at the Bragg grating 3.

Materials suitable for manufacturing a stud component 4a are for instance elastomers and in particular silicon elastomers, like e.g. silicone rubber. But any material having a sufficient elasticity in the above explained sense may be used, like e.g. unsaturated or saturated rubbers, thermoplastic elastomers, thermoplastic vulcanizates, thermoplastic polyurethane, thermoplastic olefins, resilin, elastin or poly-sulphide rubber.

Although the stud component 4a is shown in FIG. 2 having a spherical shape, it is not limited to that form. It is even not necessary that the stud element 4 surrounds the fiber 1 as shown, since also a stud element 4 being joined to the fiber 1 on only one side enables a transfer of an elongation or contraction of the stud element 4 to the respective Bragg grating 3 section of the fiber 1. The only prerequisite for this is a nonpositive join between the stud element 4 and the outer surface of the fiber 1, i.e., a connection between a partial area of the fiber's circumferential surface and a surface of the stud component 4a allowing a force transmission. A one-sided arrangement of the stud element 4 on the fiber 1 is preferred, when the fiber 1 is supported on a hard surface of an object or at the boundary between a hard layer and a flexible layer of a compound material or object.

If the fiber Bragg sensor 10 will however be used embedded within a flexible material, a rotationally symmetric geometry of the stud component 4a will be preferred, like the sphere shown or a shape substantially resembling a prolate (cigar like) or oblate (disk like) spheroid, a double cone, a disk, a cylinder, a bellied cylinder or the like more rotational geometries. An example for an irregular shaped rotational geometry is e.g. illustrated in FIG. 5 for the stud component 4a as well as for the stud component 4b.

There may be applications where the fiber Bragg sensor 10 will be used for isotropic pressure measurements. In this case, the pressure forces act on the stud component 4a equally from all sides, so that the stud component 4a will practically not be deformed when being only elastic but not compressible. To allow a respective pressure measurement, the stud component 4a is therefore made from a material with both elastic and compressive properties. When using a compressible material like for instance a foamed polymer, an increasing ambient pressure will reduce the size of the stud component 4a, which will further be transferred to the fiber Bragg grating 3 enabling a pressure measurement by monitoring the wavelength reflected at the Bragg grating 3.

Figure 7:
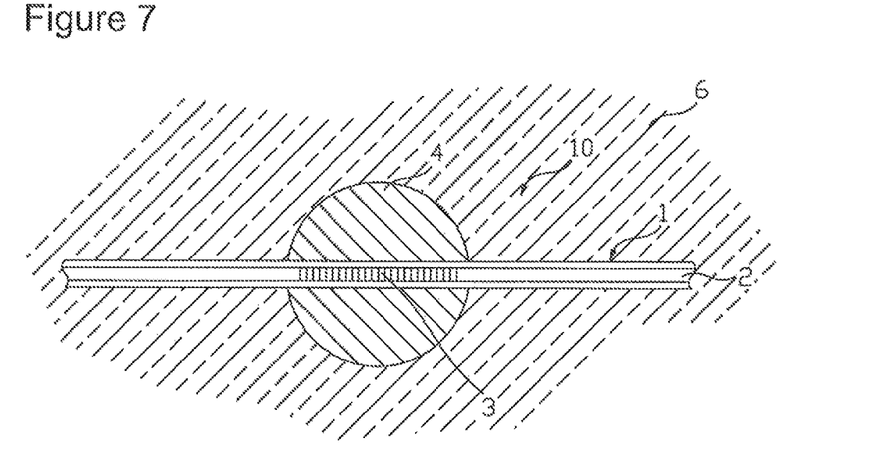
FIG. 7 shows a section of a roll cover with an embedded transverse force transducing fiber Bragg sensor according to the first example illustrated in FIG. 2 in a detailed view.

Using an elastic stud element 4 whose compressibility is adapted to the respective application enables a measurement of forces acting transverse to the longitudinal direction of a fiber Bragg grating and also the measurement of uniform ambient pressures. A fiber Bragg sensor 10 with a compressible stud element 4 can therefore be used as a pressure sensor embedded in a roll cover 6 used in papermaking machines. A respective embedding of a fiber Bragg sensor 10 with a geometry according to FIG. 2 is shown in FIG. 7. If only pressure forces transverse to the longitudinal direction are to be detected, the spherical shape of the stud element 4 surrounding the fiber 1 is preferably replaced by a rather block like shape located on the side of the fiber 1 exposed to the forces.

The stud element 4 used in the above explained fiber Bragg sensors 10 is to be regarded as a force and/or pressure transducing element redirecting the impact into the longitudinal direction of the fiber 1. The stud element 4 may be formed as an individual element nonpositively joined to the fiber 1 by use of adhesives or other connection techniques, but also as an integral part of the optical fiber 1 itself, e.g. as a bulge of the protective coating, formed for instance within the coating's tough resin buffer layer.

The Young's modulus of materials preferred for manufacturing the stud component 4a is preferably below 10 kN/mm2. If the Young's modulus is not applicable for characterizing the elasticity or flexibility of a material used, a material characterized by a secant modulus rendering a comparable deformation may be used.

Figure 3:
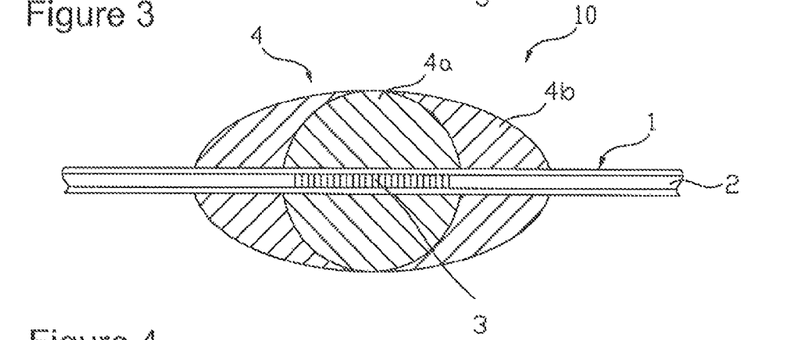
FIG. 3 shows a second example of a transverse force transducing fiber Bragg sensor.

FIG. 3 shows a modified form of the FIG. 2 embodiment. The stud element 4 is in this embodiment composed of two components, a first inner component 4a and a second outer component 4b, internalizing the inner component 4a. The inner component 4a is preferably made from an elastic material of an at the utmost minimal compressibility. The outer component 4b however is made from an elastic material of high compressibility. Like indicated above, an object is in the context of this specification regarded as being compressible, when its volume changes in response to a change in the pressure it is exposed to. The compressibility of a material can be characterized by its bulk modulus indicating the relative volume change of an object in response to a pressure change when uniformly compressing the object made from the material. Materials suited for fabricating the second component 4b are for instance soft foamed polymers, foamed plastics or other soft foams.

Figure 8:
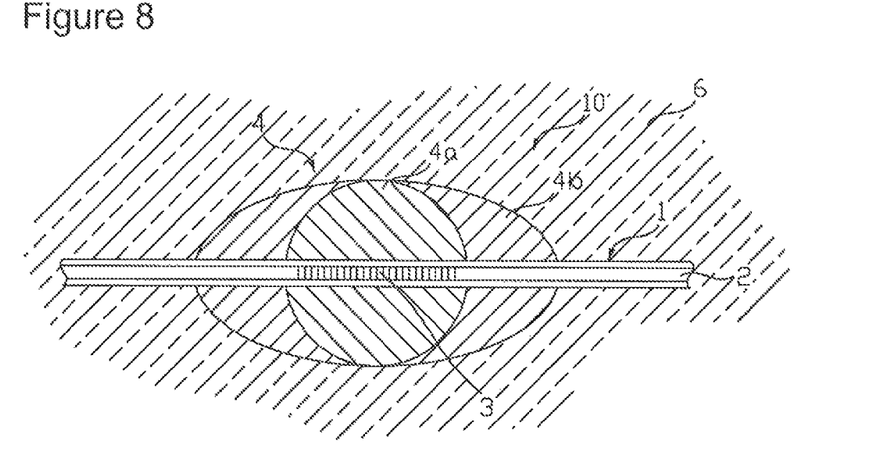
FIG. 8 shows a detailed view of a roll cover section with an embedded transverse force transducing fiber Bragg sensor according to the second example illustrated in FIG. 3.

The embodiment of the fiber Bragg sensor 10 illustrated in FIG. 3 is particularly suited for being embedded in elastic materials like e.g. roll covers for papermaking machines as illustrated in FIG. 8. When the part of the roll cover with the measuring section of the sensor 10 embedded therein, i.e. the section comprising the stud element 4 around or at the fiber Bragg grating 3, is located within the nip section of two cooperating rolls, the outer surface of the stud element 4 is uniformly pressurized. If the volume change of the roll cover 6 under pressure is transferred to the stud element 4, the inner component 4a of the stud element 4 will be flattened by the pressure, with the parts of the component 4a closer at the fiber 1 intruding in the space held before by the compressible outer component 4b. Since the equatorial circumference of the inner component 4a increases when being flattened, the fiber Bragg grating 3 is subject to strain. Of course it is also possible to use a stud element 4 having a structure rotated by ninety degree with the major axis of the spheroid 4 being oriented perpendicular to the longitudinal direction of the optical fiber 1, thus representing a prolate spheroid. In this case the grating section 3 of the fiber is not elongated when the roll cover 6 is pressurized but contracted.

Figure 4:
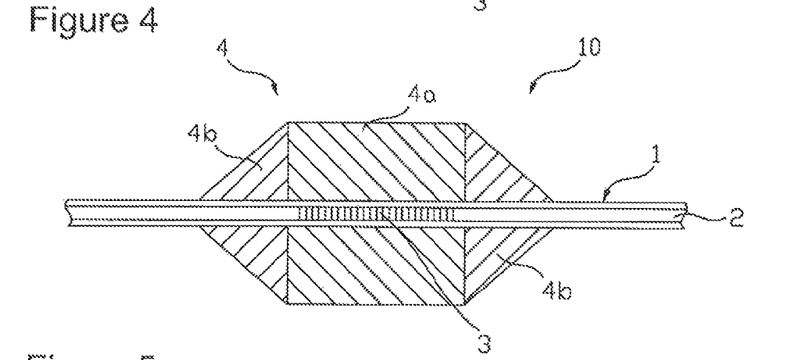
FIG. 4 shows a third example of a transverse force transducing fiber Bragg sensor.
Figure 5:
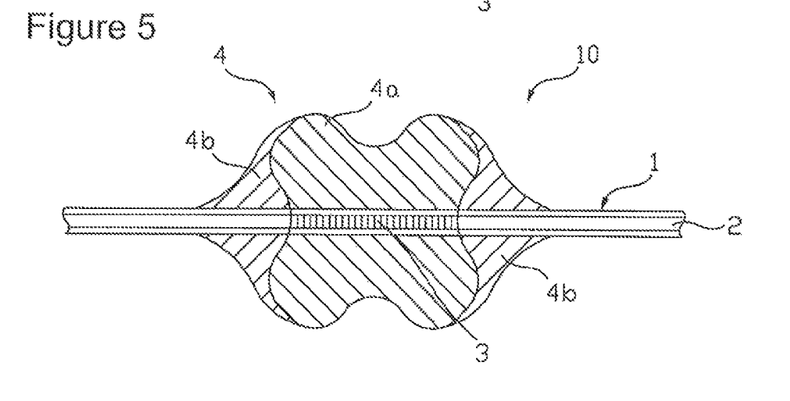
FIG. 5 shows a fourth example of a transverse force transducing fiber Bragg sensor.

The spheroidal shape of the stud element 4 shown in FIG. 3 represents only one of the many possible shapes that can be used. The incompressible elastic inner component 4a of the stud element 4 shown in FIG. 4 has a cylindrical form and is sandwiched between two conically shaped compressible outer components 4b having their respective bases oriented face to face. This geometry minimizes the deformation of the inner component 4a at its periphery and maximizes the deformation at the junction to the fiber 1. In many cases the desired function is already sufficiently achieved using frustoconically shaped outer components 4b. FIG. 5 gives an example for a stud element geometry providing a non-linear transformation of a pressure variation into a variation of the strain induced into the fiber Bragg grating 3. When a fiber Bragg sensor 10 with a stud element 4 according to FIG. 5 is embedded in a roll cover 6, two deformation characteristics have to be considered when calculating the strain imposed on the measurement section 3 of the fiber 1: the change of the pitch between the two toroidal side structures, and the elongation or compression of the central part around the fiber 1. For low pressures, the toroidal sections are mainly pressed to the sides, and for higher pressures, the inner stud element 4a is elongated in the region near the fiber 1.

Figure 6:
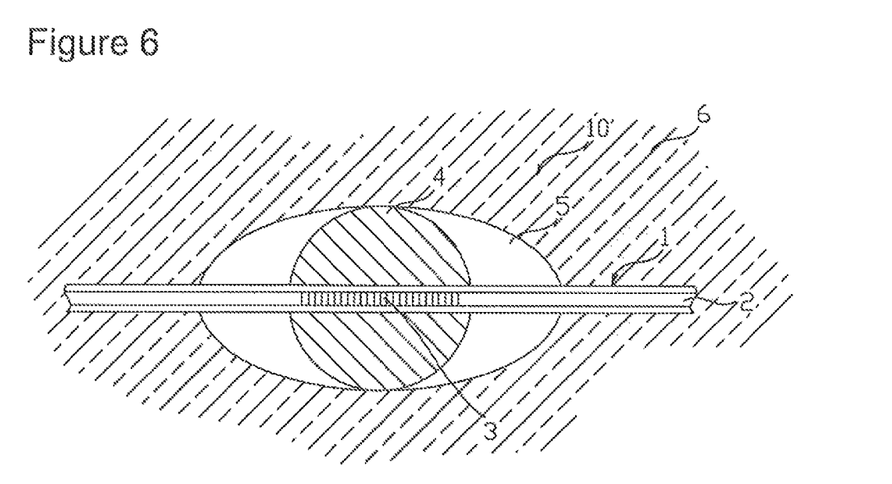
FIG. 6 shows a detailed view of a roll cover section having an embedded transverse force transducing fiber Bragg sensor according to the first example illustrated in FIG. 2 with the stud element being accommodated in a cavity larger than the stud element.

When embedding a fiber Bragg sensor 10 according to an embodiment illustrated in FIG. 2 in a roll cover 6, whereby the stud element 4 is made from an elastic, incompressible material, the embedding is preferably carried out as illustrated in FIG. 6. The stud element 4 is located within a cavity 5 formed in the embedding material 6, especially in the roll cover 6, whereby the stud element 4 is in contact with two opposite sides of the cavity 5. Upon the embedding 6 being pressurized, the pressure forces are transferred via the contact faces onto the stud element 4 deforming it in a way that the circumference of the stud element 4 near the fiber 1 increases causing a strain in the fiber Bragg grating 3.

When not the absolute values of the pressure forces present within a roll cover 6 are of interest but their respective dynamics, the configuration of FIG. 7 may be used with the stud element 4 being formed of an incompressible elastic material. Since static pressure forces have an isotropic distribution within the roll cover's nip section, only pressure wave fronts result in a measurable deformation of the stud element 4. Combining an embedded measuring section like the one just described with others as described above, enables a monitoring of the pressure profile present in a nip section of a roll cover 6 both with respect to the pressure dynamics and the nip pressure distribution within the nip.

When fiber optical sensors 10 with more than one Bragg grating 3 are used, the Bragg gratings 3 favorably differ from each other by their respective grating spacings. Thus the wavelength range in which a measurement signal is found allows the identification of the grating 3 from which the signal originates. Since the wavelength of light reflected on a Bragg grating 3 shifts according to the strain present there, the variation of the grating spacings from Bragg grating 3 to Bragg grating 3 has to yield a higher wavelength shift caused by the maximum allowable strain at a grating 3.

It is further to be noted that stud elements 4 are not necessarily located directly at the Bragg grating sections of a fiber sensor 10, but sideways to it, so that each Bragg grating is flanked by a pair of pressure transducing stud elements 4. An elongation of the stud elements 4 in the fiber region results then in a compression of the Bragg grating 3 located between each pair of stud elements 4 with the same physical effects as described above.

Figure 9:
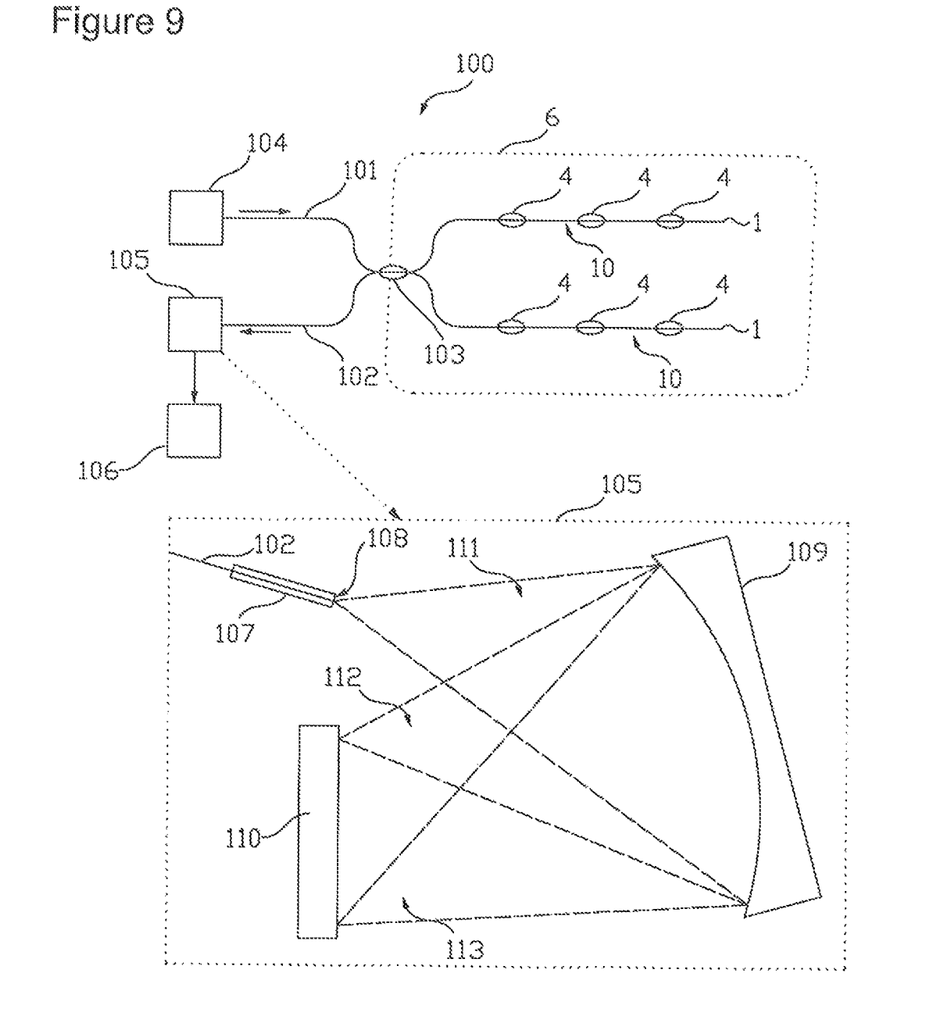
FIG. 9 shows a schematic representation of a fiber optical measurement system for pressure monitoring in roll covers.

The illustration of FIG. 9 shows a schematic representation of a fiber optical measurement system 100 using two fiber Bragg sensors 10 according to one of the above or below explained embodiments. Although each fiber 1 is shown with only four measuring sections represented by oblate spheroids 4, it is appreciated by a person skilled in the art that the number of measurement sections within a fiber 1 as well as the number of fibers 1 used in total is determined according to the given measurement task and is not limited to the illustrated embodiment.

The upper part of FIG. 9 shows the principle configuration of the fiber optical measurement system 100, and the lower part of the figure contains a schematic representation of the spectral sensor 105 used in the system 100.

A broadband light source 104 like for instance a Superluminescent Light Emitting Diode (SLED) emits light within a certain wavelength range, e.g. a range from about 800 nm to about 850 nm. The light is propagated via a fiber optical output 101 and a following fiber optical coupler 103 in a fiber optical sensor array formed by one or more fiber optical sensors 10 embedded within a roll cover material 6. The optical sensors 10 are preferably formed by single-mode fiber optical waveguides 1 having Bragg gratings 3 inscribed therein with stud elements 4 joined to each fiber section accommodating a Bragg grating 3. The average grating spacings of the measurement sections differ from each other for enabling a wavelength multiplex measurement.

For increasing the number of measurement sections within one fiber 1, the Bragg gratings 3 are aggregated in groups 12 as e.g. indicated in FIG. 1c. Within a group 12 a different grating spacing is used for each Bragg grating 3. In different groups 12 equal or similar grating spacings are used. An optical fiber section 11 containing no Bragg grating 3 separates the groups from each other. Section 11 has a considerable length in order to enable a clear distinction of the optical measurement signals by the different propagation times involved with the different distances of the groups of Bragg gratings 3 to the light source and the spectral sensor 105. A fiber optical measurement system 100 using respective fiber optical sensors 10 is referred to as a combined wavelength multiplex and time multiplex system. Since the length of the optical fiber 1 between two groups 12 of gratings 3 has to be long in relation to the dimension of the groups, these intermediate sections 11 are preferably arranged within a roll cover 6 in a low pitch helical arrangement, while the fiber grating group sections 12 are favorably arranged along the length of the roll cover 6 more or less parallel to the roll axis 8.

The lengths of the Bragg gratings 3 in a fiber optical sensor 10 vary from about 2 to about 10 mm, whereby an average length of the Bragg gratings 3 of around 6 mm is preferred. Due to the extended length of the gratings 3, ellipsoidal stud elements 4 with the main axis coaxial to the fiber axis are favorably used. The stud elements 4 together with the Bragg gratings 3 surrounded by them form the individual measurement sections of the fiber optical sensors 10. Light reflected at the various Bragg gratings 3 exits the optical fiber sensor 10 at the coupling means 103 and passes into the fiber optical waveguide 102 leading to the polychromator 105 serving as a spectral sensor for the wavelength sensitive conversion of the optical measurement signals into electrical signals. The spectral information carrying electric measurement signals are then transferred to a signal processing means 106 which may be implemented in part at the location of the polychromator 105 and in part remote thereto. Since the remote part is usually not on the roll 20 supporting the fiber optical sensors 10, data are preferably exchanged between the two or perhaps more parts of the signal processing means 106 by means of a radio link.

The lower part of FIG. 9 shows the basic configuration of a polychromator 105 that may be used as spectral sensor. Light enters the configuration via the entry cleavage 108 at the exit of a coupling element 107 terminating the fiber optical waveguide 102. The emitted light beam 111 widens and illuminates a reflective grating 109 having a curved surface. The curvature of the grating is adapted to focus each spectral component 112, 113 of the light beam 111 onto a different location of a photosensitive means 110, like, e.g., a Charge Coupled Device (CCD), outputting the electrical signals according to the location of their respective generation.

To reduce the amount of measurement data to be transferred from the part of the processing means 106 located near the spectral sensing means 105 to the remote part, under-sampling is employed. Under-sampling means that only one or a few samples are taken from each measurement signal at a time. Sampling is repeated at each further occurrence of the signal, but with slightly shifted sampling positions. Assuming that signal changes are very slow compared to the sampling rate (i.e. the frequency with which the sampling is repeated), the measurement signal can be restored with sufficient accuracy from the under-sampled data.

In the present case, the measurement signal is related to the pressure in the roll cover 6 passing the nip section. Except for special failures, like e.g. a roll fracture or the like, the pressure profile in the nip does only change very slowly, if at all. Accordingly, the measurement signals obtained with fiber Bragg sensors 10 located in the roll cover 6 will be identical or almost identical for subsequent revolutions of the roll 20. This gives the possibility to sample the pressure forces only once or a few times per roll revolution, but at a slightly shifted revolution angle from one measurement to the next. The pointwise measurement provides a significant reduction of the measurement rate without impairing the precision of the pressure profile representation.

Light source 104, waveguides 101 and 102, coupler 103, spectral sensor 105, and the local module of the signal processing means 106 are as mentioned above preferably mounted in the recess 23 within the housing 30 located on the side of the roll 20 supporting the roll cover sensory 100 as shown in FIGS. 1a to 1c. The housing 30 is preferably removably attached to the roll core 21. Due to the centrifugal forces involved, the light source is oriented for emitting the light in a direction radial to the rolls rotation axis 8. Therefore, only the distance between the light emitting area of the light source 104 and the fiber 101 may change with the rotation speed of the roll 20, but not the lateral adjustment of the optical fiber 101 relative to the light source 104, thus guaranteeing a reliable coupling of the light into the fiber optical waveguide.

The polychromator 105 is favorably mounted on a plane oriented tangentially with respect to the rotation of the roll 20, resulting in all components of the optical system being exposed to substantially the same forces. With the optical components thus not being subject to diverging forces, the optical paths of the polychromator 105 are not affected by the roll rotation. Possibly existing diverging force vectors close to the edges of the polychromator's base plate (located at a slightly larger distance from the center of rotation) are compensated by application of a buffer material placed below the base plate and the rotating housing, which is made slightly thinner or softer in the central region of the base plate.

Figure 10:
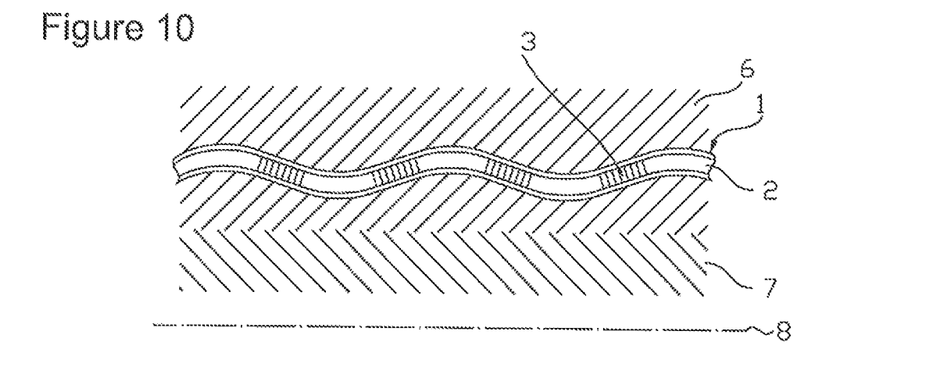
FIG. 10 shows a modified fiber optical measurement system for measuring radial deformations of a roll cover.

In a different embodiment of the fiber optical measurement system 100, fiber Bragg grating sensors 10 are used without a stud element 4 for transforming transverse forces. A respectively modified fiber optical measurement system 100 is shown in FIG. 10. The fiber 1 containing the Bragg gratings 3 is embedded in the roll cover 6 in a serpentine arrangement, whereby the lateral deflections are oriented in the radial direction of the roll, i.e. perpendicular to the rotation axis 8. The gratings 3 are located between two local extrema of the arrangement. Accordingly, the longitudinal axis of each Bragg grating 3 has a component directed into the radial direction of the roll cover 6, and is thus suited to measure the radial component of the roll cover deformation in the nip section of two cooperating rolls 20. The serpentine like embedding can easily be accomplished when the roll cover 6 is manufactured in several layers. First an inner layer is produced, which will be directly supported on the shell 7 of a roll core 21. The second layer comprises a series of holes arranged along a line like in a dotted line. The Bragg fiber 1 is then threaded through the holes along the line resulting in the desired serpentine configuration. This central layer carrying the fiber 1 is then pulled over the inner roll cover layer and covered with a further or final layer. Different to the embodiment shown in FIG. 10, some of the serpentine deflection may be oriented tangentially to the roll 20 for measuring tangential forces.

Unfortunately the grating spacings of the Bragg gratings 3 are not only subject to strain but also to temperature changes. To compensate for the temperature changes within a roll cover 6, one of the two fiber optical sensors 10 shown in FIG. 9 is preferably formed by a Bragg grating fiber 1 without any stud elements 4 attached to it, whereby the fiber 1 is arranged along the length of the roll cover 6 in parallel to the roll axis. Since the grating spacings of this fiber 1 are then not affected by roll cover deformation, they are only sensible to temperature changes. Comparing the measurement signals obtained from one of the fiber optical sensors 10 explained above with the reference measurement signals obtained from this sensor fiber 1 does thus allow for a temperature compensation of the measurement signals.

In a different approach temperature compensation can be achieved under the assumption that the temperature conditions within a roll cover 6 will not change within one revolution of the roll 20. Particularly when the peak height of the pressure extremum in the nip is the only object of the measurement, temperature monitoring can be achieved using the measurement signals from Bragg gratings 3 located outside the momentary nip section as temperature reference signals.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An industrial roll, comprising:
   a roll core having a cylindrical section with a substantially cylindrical geometry;
   a roll cover sheathing said cylindrical section of said roll core at least partly; and
   at least one fiber optical sensor at least one of embedded in said roll cover and located between said roll cover and said roll core, said at least one fiber optical sensor including at least one measuring section that is formed by a transverse force transducing fiber Bragg sensor, said transverse force transducing fiber Bragg sensor including a fiber optical waveguide and a stud element, said fiber optical waveguide including a fiber core, a fiber cladding, a Bragg grating located in said fiber core, a first section which houses said Bragg grating, a longitudinal direction, and a circumferential surface including a partial area, said Bragg grating including a grating spacing, said stud element including a first component and being nonpositively joined to said partial area of said circumferential surface of said fiber optical waveguide, a dimension of said partial area in said longitudinal direction of said fiber optical waveguide being longer than said grating spacing of said Bragg grating, said partial area being located at said section of said fiber optical waveguide which houses said Bragg grating, at least said first component of said stud element being formed from a first material having a Young's modulus of less than 10 kN/mm$^2$.

2. The industrial roll according to claim 1, wherein a compressibility of said first material is characterized by a bulk modulus of more than 10$^{10}$ Pa.

3. The industrial roll according to claim 1, wherein said first material has a Young's modulus of less than 1 kN/mm$^2$.

4. The industrial roll according to claim 1, wherein said first material has a Young's modulus in a range of 0.001 to 0.01 kN/mm$^2$.

5. The industrial roll according to claim 1, wherein said transverse force transducing fiber Bragg sensor includes at least one second component formed of a second material, said at least one second component being arranged adjoining said first component with respect to said longitudinal direction of said fiber optical waveguide and on said circumferential surface of said fiber optical waveguide, said second material having a Young's modulus of less than 10 kN/mm$^2$ and a high compressibility characterized by a bulk modulus of less than 106 N/m$^2$.

6. The industrial roll according to claim 5, wherein said fiber optical waveguide includes opposite sides, said stud element including two of said second component adjoining said first component on said opposite sides with respect to said longitudinal direction of said fiber optical waveguide.

7. The industrial roll according to claim 5, wherein said at least one second component of said stud element resembles one of a cone and a frustum including a base which contacts said first component.

8. The industrial roll according to claim 5, wherein said at least one second component is a polymer foam.

9. The industrial roll according to claim 1, wherein said roll cover forms a cavity therein, said transverse force transducing fiber Bragg sensor being embedded at least one of in said roll cover and between said roll cover and said roll core, said stud element being located within said cavity formed in said roll cover.

10. The industrial roll according to claim 9, wherein a dimension of said cavity in said longitudinal direction of said fiber optical waveguide is larger than a dimension of said stud element in said longitudinal direction of said fiber optical waveguide.

11. The industrial roll according to claim 10, wherein said stud element includes two sides, said stud element being arranged within said cavity so as to leave a void on both said two sides of said stud element with respect to said longitudinal direction of said fiber optical waveguide.

12. The industrial roll according to claim 1, wherein said stud element is arranged on said fiber optical waveguide with said fiber optical waveguide penetrating said stud element.

13. The industrial roll according to claim 12, wherein said fiber optical waveguide includes an axis and said stud element includes an axis of symmetry, said stud element having a rotationally symmetric geometry with said axis of said fiber optical waveguide located at said axis of symmetry of said stud element.

14. The industrial roll according to claim 1, wherein said first component of said stud element has a shape resembling one of a sphere, a prolate spheroid, an oblate spheroid, a double cone, a disk, a cylinder, and a bellied cylinder.

15. The industrial roll according to claim 1, wherein said stud element and said circumferential surface of said fiber optical waveguide include a nonpositive joint therebetween including a part which is formed by a fiber coating.

16. The industrial roll according to claim 1, wherein said first material is silicone rubber.

17. The industrial roll according to claim 1, further including a sensor supply including:
    a broadband light source configured for launching light into said fiber optical sensor;
    a coupler adapted for coupling out light from said transverse force transducing fiber Bragg sensor which has been reflected at said Bragg grating of said transverse force transducing fiber Bragg sensor;
    a spectral sensor for a wavelength sensitive conversion of light coupled out from said transverse force transducing fiber Bragg sensor into a plurality of electrical measurement signals;
    a signal processor configured for processing said plurality of measurement signals; and a transmitter configured for transmitting a plurality of processed measurement signals;

wherein the industrial roll further includes a side face and a circumferential surface with a rim area, said sensor supply being located on said side face at said rim area of said circumferential surface of the industrial roll.

18. The industrial roll according to claim 17, wherein said sensor supply further includes a fiber optical waveguide extending from said broadband light source to said coupler and a fiber optical waveguide extending from said coupler to said spectral sensor, said cylindrical section of said roll core including a side face, said fiber optical waveguide, said fiber optical waveguide, said coupler, said broadband light source, said spectral sensor, and said signal processor of said sensor supply being arranged on a side face of said cylindrical section of said roll core such that a plurality of effects of a plurality of diverging components of a plurality of centrifugal forces acting on individual ones of said fiber optical waveguide, said fiber optical waveguide, said coupler, said broadband light source, said spectral sensor, and said signal processor are minimized.

19. The industrial roll according to claim 1, wherein said transverse force transducing fiber Bragg sensor includes more than one said Bragg grating with respectively different ones of said grating spacing.

20. The industrial roll according to claim 19, wherein the industrial roll includes a plurality of groups of said Bragg grating, said transverse force transducing fiber Bragg sensor including a fiber optical waveguide section second, said plurality of groups of Bragg gratings being separate from each other by said fiber optical waveguide section second containing no said Bragg grating, individual ones of said Bragg gratings within a respective one of said plurality of groups of Bragg gratings each having a respectively different said grating spacing, a length of said fiber optical waveguide section second separating two of said plurality of groups of Bragg gratings being sufficiently long so as to enable a time-separated registration of light reflected in different ones of said plurality of groups of Bragg gratings.

21. The industrial roll according to claim 20, wherein said grating spacings of said Bragg gratings of one of said plurality of groups of Bragg gratings corresponds to said grating spacings of said Bragg gratings within another one of said plurality of groups of Bragg gratings.

22. The industrial roll according to claim 20, wherein said transverse force transducing fiber Bragg sensor includes at least two third sections each including a respective one of said plurality of groups of Bragg gratings, said two third sections being oriented in parallel to an axis of rotational symmetry of the industrial roll, said fiber optical waveguide section of said transverse force transducing fiber Bragg sensor separating said two third sections of said transverse force transducing fiber Bragg sensor being oriented along a substantially helical line around said axis of rotational symmetry of the industrial roll.

23. The industrial roll according to claim 1, wherein at least one said fiber optical sensor is embedded at least one of in said roll cover and between said roll cover and said roll core substantially in parallel to an axis of rotational symmetry of the industrial roll.

24. The industrial roll according to claim 1, wherein at least one said fiber optical sensor is embedded at least one of in said roll cover and between said roll cover and said roll core substantially along a helical line around an axis of rotational symmetry of the industrial roll.

25. The industrial roll according to claim 24, wherein at least one said Bragg grating located in a fourth section of said transverse force transducing fiber Bragg sensor oriented along a substantially helical line around said axis of rotational symmetry of the industrial roll is not joined to a respective said stud element.

26. The industrial roll according to claim 1, wherein at least one said fiber optical sensor is embedded at least one of in said roll cover and between said roll cover and said roll core with at least one said Bragg grating being oriented at an angle between 10° to 80° with respect to a circumferential direction of the industrial roll.

27. The industrial roll according to claim 1, wherein at least one said fiber optical sensor is embedded at least one of in said roll cover and between said roll cover and said roll core with at least one said Bragg grating being oriented at an angle of 45° with respect to a circumferential direction of the industrial roll.

28. A roll cover, comprising:

at least one fiber optical sensor at least one of embedded in the roll cover and configured for being located between the roll cover and a roll core of an industrial roll, said at least one fiber optical sensor being formed by a transverse force transducing fiber Bragg sensor which includes a fiber optical waveguide and a stud element, said fiber optical waveguide including a fiber core, a fiber cladding, a Bragg grating located in said fiber core, a first section which houses said Bragg grating, a longitudinal direction, and a circumferential surface including a partial area, said Bragg grating including a grating spacing, said stud element including a first component and being nonpositively joined to said partial area of said circumferential surface of said fiber optical waveguide, a dimension of said partial area in said longitudinal direction of said fiber optical waveguide being longer than said grating spacing of said Bragg grating, said partial area being located at said section of said fiber optical waveguide which houses said Bragg grating, at least said first component of said stud element being formed from a first material having a Young's modulus of less than 10 kN/mm².

29. The roll cover according to claim 28, wherein the roll cover has a Young's modulus in a range of 5 kN/mm² to 10 kN/mm².

30. A fiber optical sensor, comprising:

a transverse force transducing fiber Bragg sensor including a fiber optical waveguide and a stud element, said fiber optical waveguide including a fiber core, a fiber cladding, a Bragg grating located in said fiber core, a first section which houses said Bragg grating, a longitudinal direction, and a circumferential surface including a partial area, said Bragg grating including a grating spacing, said stud element including a first component and being nonpositively joined to said partial area of said circumferential surface of said fiber optical waveguide, a dimension of said partial area in said longitudinal direction of said fiber optical waveguide being longer than said grating spacing of said Bragg grating, said partial area being located at said section of said fiber optical waveguide which houses said Bragg grating, at least said first component of said stud element being formed from a first material having a Young's modulus of less than 10 kN/mm², the fiber optical sensor configured for being at least one of (a) embedded in a roll cover of an industrial roll, and (b) located between said roll cover and a roll core of the industrial roll wherein said roll core has a cylindrical section with a substantially cylindrical geometry and said roll cover sheathes said cylindrical section of said roll core at least partly.

* * * * *